United States Patent
Bodas et al.

(10) Patent No.: US 10,904,127 B2
(45) Date of Patent: Jan. 26, 2021

(54) SYSTEMS AND METHODS FOR DETECTING A ZOMBIE SERVER

(71) Applicant: INTEL CORPORATION, Santa Clara, CA (US)

(72) Inventors: Devadatta Bodas, Federal Way, WA (US); Justin J. Song, Olympia, WA (US); Muralidhar Rajappa, Chandler, AZ (US); Andy Hoffman, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 989 days.

(21) Appl. No.: 15/181,001

(22) Filed: Jun. 13, 2016

(65) Prior Publication Data
US 2017/0359246 A1 Dec. 14, 2017

(51) Int. Cl.
*H04L 12/26* (2006.01)
*H04L 29/08* (2006.01)

(52) U.S. Cl.
CPC .......... *H04L 43/16* (2013.01); *H04L 43/0817* (2013.01); *H04L 43/0876* (2013.01); *H04L 67/10* (2013.01)

(58) Field of Classification Search
CPC . H04L 43/0817; H04L 43/0876; H04L 43/16; H04L 67/10; H04L 41/142; H04L 69/22; H04L 69/329
See application file for complete search history.

(56) References Cited

U.S. PATENT DOCUMENTS

| | | | |
|---|---|---|---|
| 5,852,818 | A | 12/1998 | Guay et al. |
| 8,468,601 | B1 | 6/2013 | Bakhmutov |
| 8,478,981 | B2 | 7/2013 | Khan et al. |
| 8,631,244 | B1 | 1/2014 | Potts et al. |
| 9,059,853 | B1 * | 6/2015 | Bortz ........................ H04L 9/32 |
| 2004/0054737 | A1 | 3/2004 | Daniell |
| 2004/0221011 | A1 | 11/2004 | Smith et al. |
| 2004/0260756 | A1 | 12/2004 | Forstall et al. |

(Continued)

FOREIGN PATENT DOCUMENTS

WO  WO-2017218149 A1 * 12/2017 ........... H04L 41/142

OTHER PUBLICATIONS

U.S. Appl. No. 15/181,041, Notice of Allowance, 17 pages, dated Dec. 17, 2019.

(Continued)

*Primary Examiner* — Michael C Lai
(74) *Attorney, Agent, or Firm* — Green, Howard & Mughal LLP

(57) ABSTRACT

A zombie server can be detected. Detecting a zombie server can include labeling a plurality of processes as utility software, calculating a utilization of utility software on the plurality of processes executed in one or more processing resources during an interval of time, and calculating a server utilization of the one or more processing resources during the interval of time. Detecting the zombie server can also include determining whether a difference between the utilization of utility software and the server utilization is greater than a threshold, and identifying a server that hosts the processing resource as a zombie server based on a determination that the difference is smaller than the threshold.

16 Claims, 8 Drawing Sheets

(56) References Cited

U.S. PATENT DOCUMENTS

| | | |
|---|---|---|
| 2004/0268358 A1* | 12/2004 | Darling .................. H04L 29/06 |
| | | 718/105 |
| 2005/0223066 A1 | 10/2005 | Buchheit et al. |
| 2007/0005715 A1 | 1/2007 | Levasseur et al. |
| 2009/0287768 A1 | 11/2009 | Tanaka |
| 2011/0016342 A1* | 1/2011 | Rowan ................ G06F 11/3006 |
| | | 713/340 |
| 2011/0296316 A1 | 12/2011 | Gupta |
| 2015/0193330 A1 | 7/2015 | Pillai et al. |

OTHER PUBLICATIONS

PCT/US2017/034137, International Search Report and Written Opinion, dated Aug. 28, 2017, 11 pages.
International Preliminary Report on Patentability dated Dec. 27, 2018, for PCT Patent Application No. PCT/US2017/034137.
Restriction Requirement dated Aug. 14, 2019, for U.S. Appl. No. 15/181,041.

* cited by examiner

SYSTEMS AND METHODS FOR DETECTING A ZOMBIE SERVER

TECHNICAL FIELD

This application relates to systems and methods for detecting a zombie or comatose server.

BACKGROUND

In some organizations, users purchase servers that are maintained by information technology (IT) departments. The servers may be located in facilities such as data centers. The physical hardware and the security of the servers are maintained by facility managers. Servers may be purchased for specific applications or projects. Over time and as the projects are completed, need for the applications may diminish. As such, racks and data centers may host unused servers. These servers are referred to as zombie servers. The terms "zombie server" and "comatose server" can be used interchangeably. Zombie servers may be regularly maintained by IT specialists even though the zombie servers are no longer used by customers. Besides IT resources, zombie servers occupy rack space, consume energy (e.g., power), and burden cooling resources. Expenses on zombie servers can be considered as wasted resources because the zombie servers do not contribute to productivity. In some environments, zombie servers may occupy 10% to 20% of servers in a data center and/or rack. A similar situation exists even in virtual environments where resources get allocated to an application and remain unused. For example, a virtual server may be created without being used. The virtual server may be considered a virtual zombie server. As used herein, the term "zombie server" also includes virtual zombie servers.

In a number of previous approaches, zombie servers are identified by tracking processor utilization. However, tracking processor utilization to identify zombie servers may include a number of limitations. For example, a processor of a server may process services that are not consumed by customers (e.g., users). For example, management software executed on the server may contribute to processor utilization without a customer utilizing the server. Management software and/or services that may occur in zombie servers that may be carried out without a consumer's request may include backup services, security services, and virtualization services, among others. That is, management services may contribute to processor utilization such that a server receiving the management services may appear to be utilized by a customer when the server is not actually utilized by the customer.

Identifying a zombie server may be difficult because non-zombie servers (e.g., servers that are utilized by customers) that are used for productivity applications may also have low utilization. That is, there may be little difference in processor utilization as it corresponds to zombie servers and non-zombie servers.

DETAILED DESCRIPTION OF PREFERRED EMBODIMENTS

Figure 1:
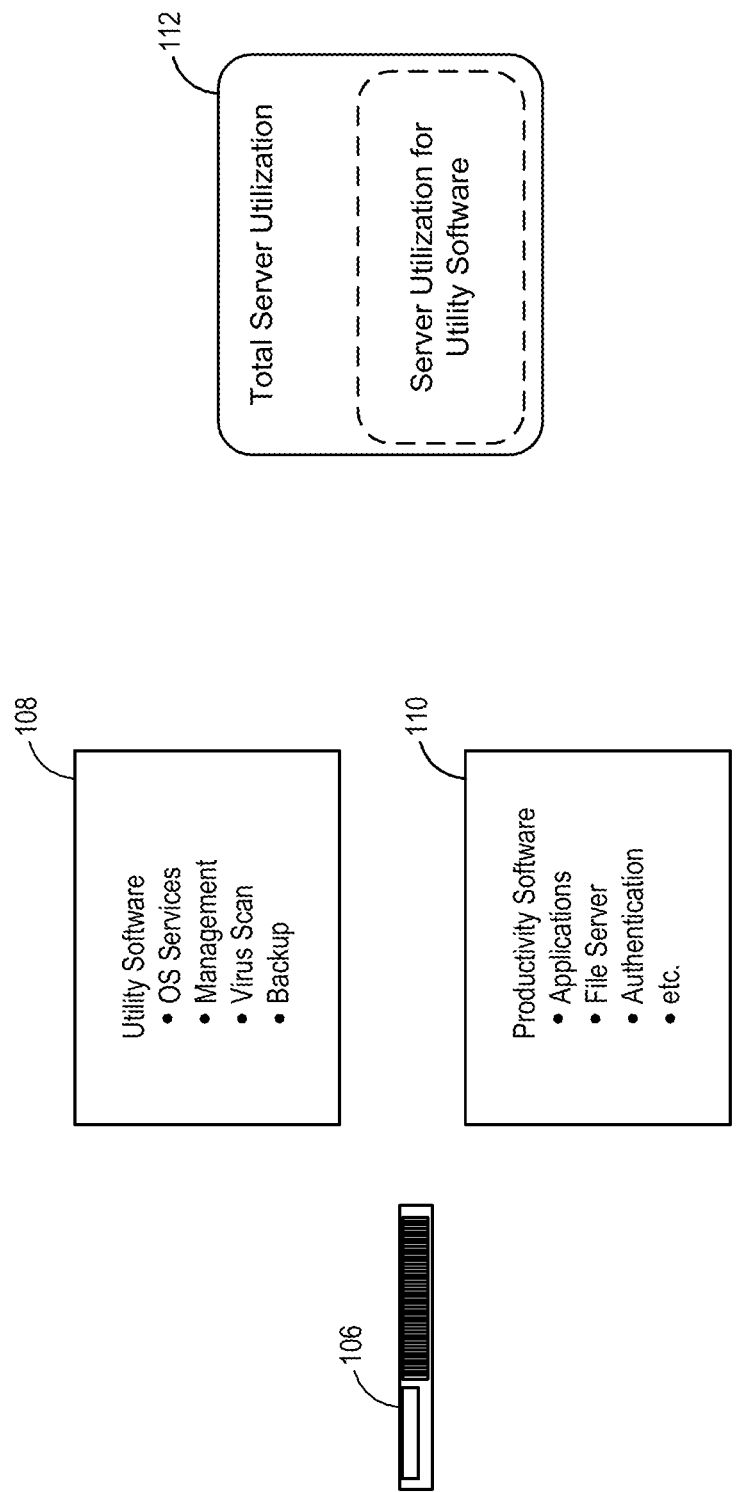
FIG. 1 is a system diagram of a server according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present disclosure provides systems and methods for detecting a zombie or comatose server. Detecting a zombie server can include labeling a plurality of processes as utility software and calculating a utilization of utility software on the plurality of processes executed in one or more processing resources during an interval of time. Detecting a zombie server can also include calculating a server utilization of the one or more processing resources during the interval of time, determining whether a difference between the utilization of utility software and the server utilization is greater than a threshold, and identifying a server that hosts the processing resource as a zombie server based on a determination that the difference is smaller than the threshold.

In some embodiments, a system for detecting a zombie server can include a first server comprising memory and at least one processing resource, the first server comprising instructions to sample a plurality of process identifications (IDs) of a plurality of processes executed on a processing resource of a second server, wherein each of the plurality of process IDs is sampled during a first time interval and calculate a plurality of central processing unit (CPU) run times for the plurality of process IDs based on the first time interval, each of the plurality of CPU run times corresponding to one of the plurality of process IDs. The first server also comprises instructions to calculate a utilization of utility software on the plurality of processes executed in the processing resource repetitively every second time interval, calculate a server utilization of the processing resource repetitively every second time interval, and determine whether the second server is a zombie server based on the utilization of utility software and the server utilization repetitively every third time interval.

Detecting a zombie server can also include instructions to query a server on active processes running on a processing resource of a server using a task management program repetitively every first time interval and calculate a utilization of utility software based on the active processes that are associated with utility software, repetitively every first time interval. The server can also include instructions to calculate a server utilization based on the active processes every first time interval, compare the utilization of the utility software and the server utilization every second time interval, and mark the server as a zombie server based on the comparison every second time interval.

In some embodiments, a system for detecting a zombie server can include a server comprising a processing resources and a computing device. The computing device can be configured to receive network traffic, calculate a percentage of the network traffic as being utility software layer 7 protocols every first time interval, mark the server as a zombie server based on the percentage every second time interval, and distribute the network traffic to the server.

Detecting a zombie server can further include receiving, at a server, network traffic, calculating a percentage of the network traffic as being productivity software layer 7 protocols every first time interval, marking the server as a zombie server based on the percentage every second time interval, and processing the network traffic at the server to perform a number of actions by the productivity software.

Detecting a zombie server can also include receiving, at a second computing device, network traffic sent to a first computing device, wherein the first computing device is configured to distribute the network traffic to a plurality of servers, calculating a percentage of a portion of the network traffic as being utility software layer 7 protocols every first time interval, for each of the plurality of servers, wherein the portion of the network traffic is network traffic to a respective server, marking each of the plurality of servers as zombie servers based on a respective percentage every second time interval, and forwarding the network traffic to the first computing device.

In a number of embodiments described herein, zombie servers may be identified by tracking utility software utilization and/or productivity software utilization. As used herein, productivity software utilization can describe user applications, file server applications, and/or authentication applications, among others. Utility software can describe operating system (OS) services, management services, security services, and/or backup services, among others.

In some embodiments, productivity software and/or utility software can be defined by customers and/or IT specialists. For example, processes, subprocesses, and/or threads associated with software executed on a server may be categorized as productivity software or utility software by customers and/or IT specialists.

Software utilization (e.g., utility software and/or productivity software) can be defined as a duration of time that the software is executed on at least one of a plurality of processors of a server. For example, utility software utilization is a duration of time that the utility software is executed on at least one of the plurality of processors of a server.

In some examples, zombie servers may be identified by comparing utility software utilization to server utilization and/or productivity software utilization. For example, a zombie server may be identified in response to determining that productivity software utilization is zero.

As used herein, the terms "processor utilization" and "server utilization" may be used interchangeably. The term "server utilization" may describe a duration of time that at least one of a plurality of processors is utilized. For example, a server utilization may describe the utilization of one, two, three, or more processors.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. The network may include a wireless network.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, or other protocols over twisted pair, coaxial, or optical fiber cables, telephone lines, radio waves, satellites, microwave relays, modulated AC power lines, physical media transfer, and/or other data transmission "wires" and/or wireless protocols known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, a SoC, a SiP, an FPGA, a PAL, a PLA, an FPLA, a PLD, or other customized or programmable device. The memory may include static RAM, dynamic RAM, flash memory, one or more flip-flops, ROM, CD-ROM, disk, tape, or a magnetic, an optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, an optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing a number of examples described herein is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to a number of examples described herein is already available, such as: general-purpose computers, computer programming tools and techniques, computer networks and networking technologies, digital storage media, authentication, access control, and other security tools and techniques provided by public keys, encryption, firewalls, and/or other means.

FIG. 1 is a system diagram of a server according to one embodiment. FIG. 1 includes a server 106, utility software 108, and productivity software 110. The utility software 108 and/or the productivity software 110 can be executed on the server 106.

As previously described, the utility software 108 can include OS services, management services, virus scan services (e.g., security services), and/or backup services, among other types of services. The productivity software 110 can include user applications, file server applications, and/or authentication applications, among other types of applications.

The utilization of the utility software 108 and the utilization of the productivity software 110 can define a server utilization 112. In some embodiments, the server utilization 112 can be defined as the average utilization of a plurality of processors in the server 106. A utilization of each of the plurality of processors can be defined as the unhalted cycles of a processor in a time period divided by the total processor cycles of the time period. In some embodiments, a utilization of each of the plurality of processors can be defined as a first duration of time of unhalted cycles of the processor divided by a second duration of time of the total processor cycles.

Figure 2:
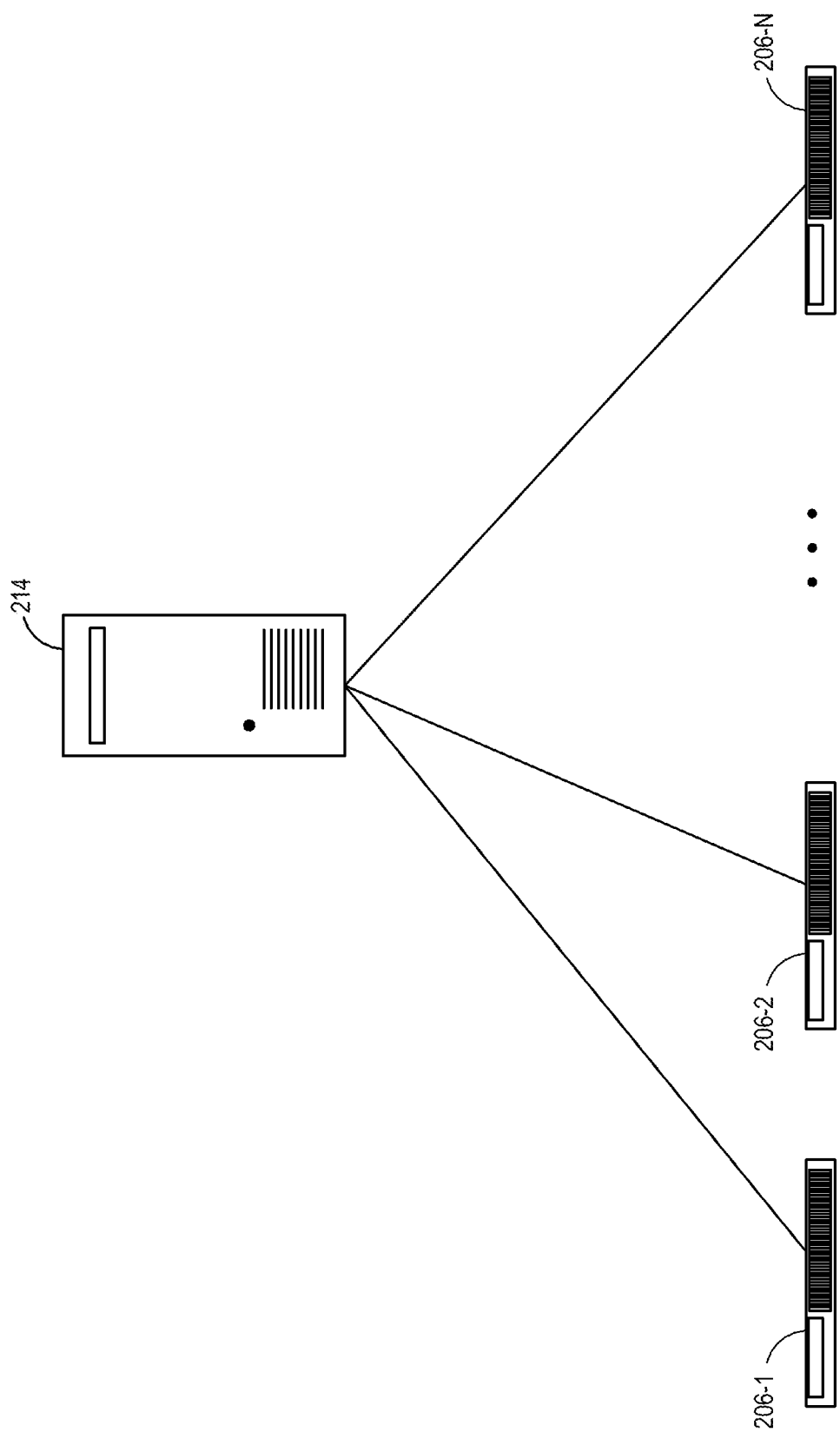
FIG. 2 is a system diagram of a data center according to one embodiment.

FIG. 2 is a system diagram of a data center according to one embodiment. FIG. 2 includes servers 206-1, 206-2, . . . , 206-N (referred to generally as servers 206), which are analogous to the server 106 in FIG. 1. FIG. 2 also includes a management unit 214. The servers 206 can be part of a rack and/or a data center. Each of the servers 206 can include a plurality of processing resources such as central processing units (CPUs) and/or graphical processing units (GPUs), among others. In some examples, the servers 206 can be dispersed among separate racks, data centers, and/or locations.

Each of the servers 206 can be monitored to determine whether any of the servers 206 are zombie servers. For example, each of the servers 206 can monitor itself to determine whether it is a zombie server. Once one of the servers 206 determines that it is a zombie server, any one of the servers 206 can report the finding to the management unit 214.

In some examples, each of the servers 206 can monitor a different one of the servers 206 to determine whether the monitored server is a zombie server. Once a monitoring server from the servers 206 determines that the monitored server is a zombie server, the monitoring server can report the finding to the management unit 214.

In a different embodiment, the management unit 214 can monitor each of the servers 206 to determine whether the monitored server is a zombie server. As used herein, monitoring the servers 206 can include monitoring the software and/or hardware of the servers 206 and/or the messages coming to and/or from the servers 206.

Figure 5:
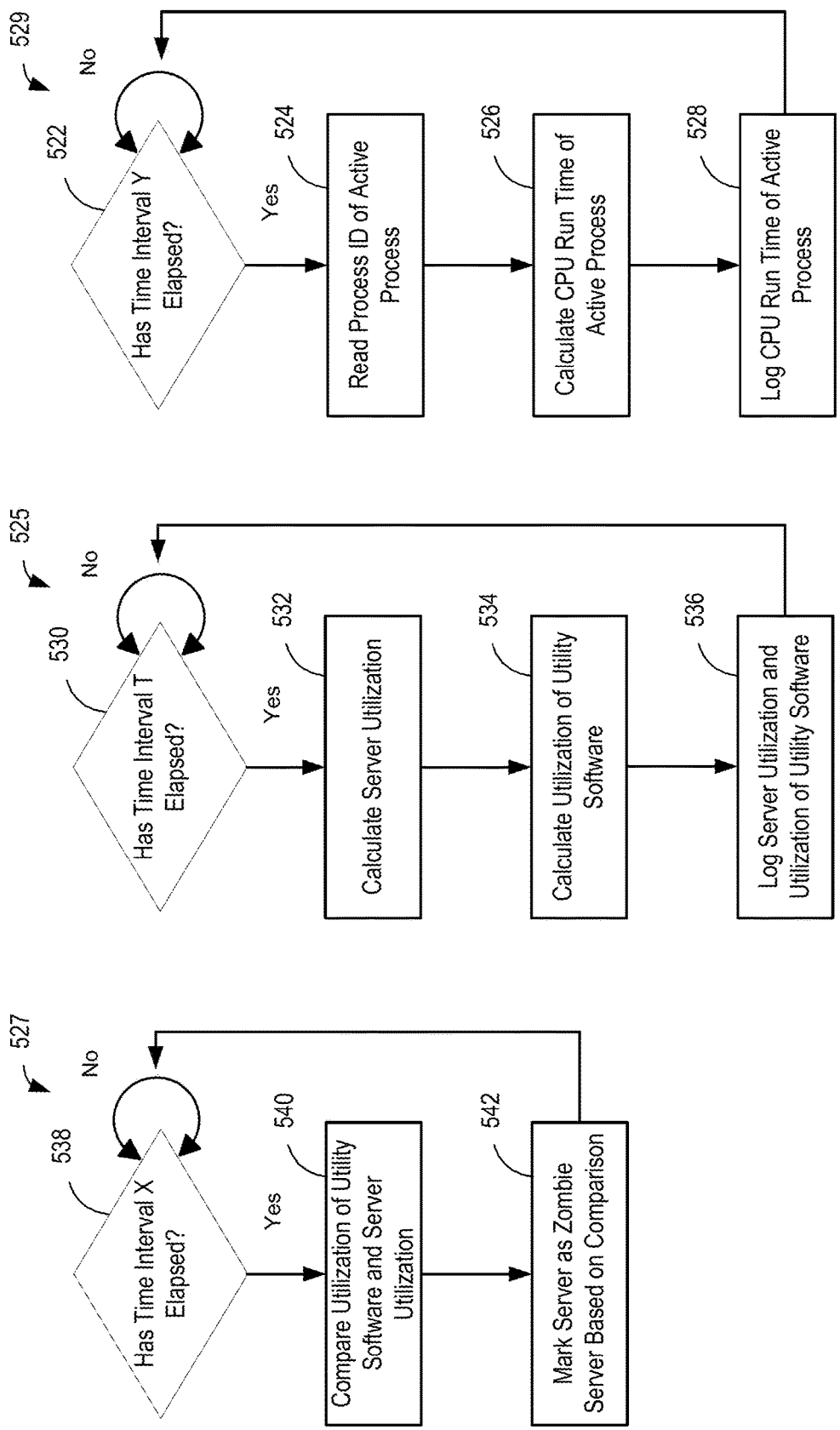
FIG. 5 is a flowchart of an approach to identifying a zombie server according to one embodiment.

In some examples, a zombie server can be identified based on the network traffic coming to and/or from the servers 206. For example, the management unit 214 can monitor a network device to identify network traffic directed to and/or from the servers 206. The network device can be a router, a switch, a bridge, and/or a gateway, among other network devices. In some examples, the network device can be a computing system that intercepts network traffic directed to and/or from a router, a switch, a bridge, and/or a gateway, among other network devices. FIG. 5 further describes identifying a zombie server based on network traffic.

Figure 3:
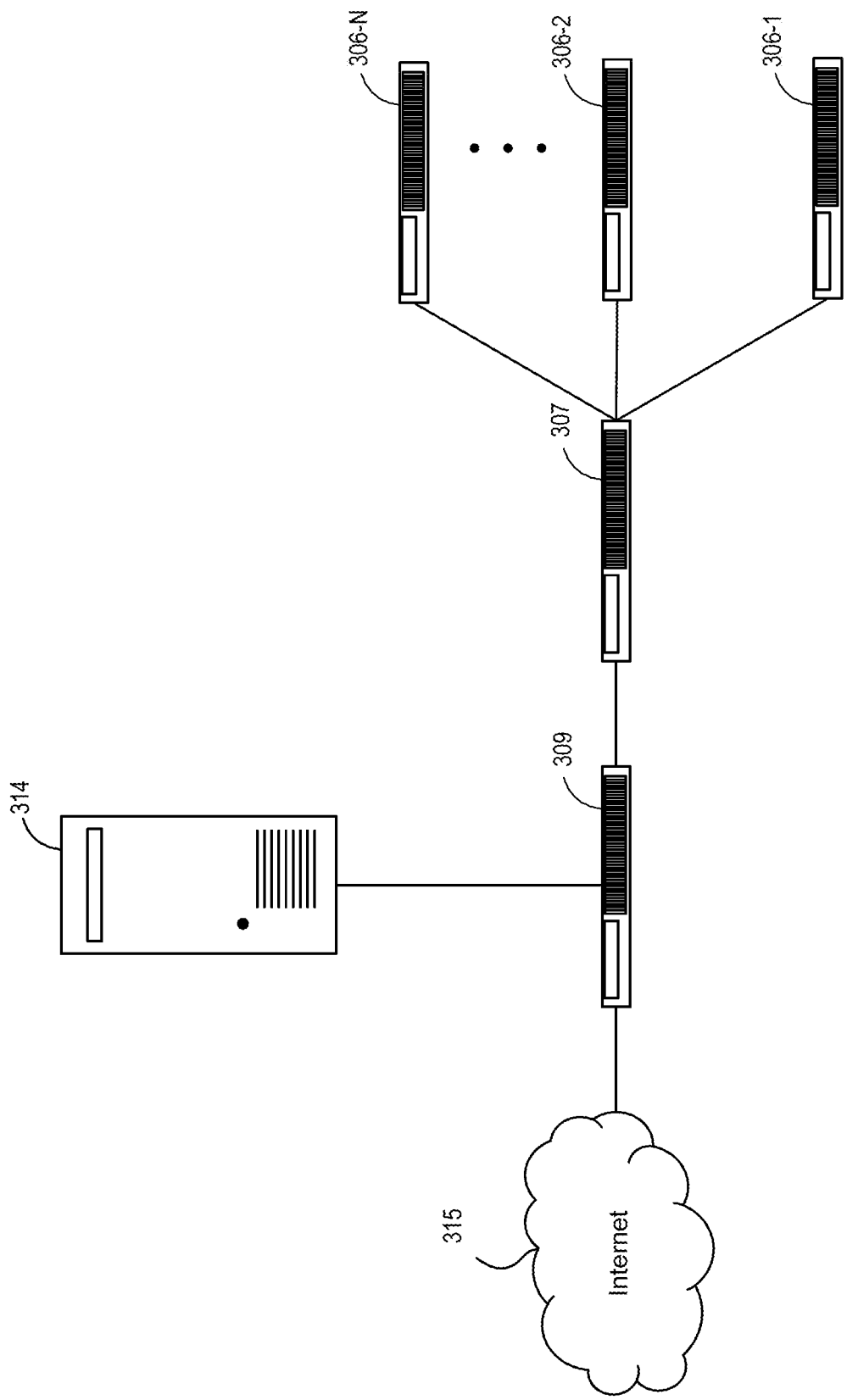
FIG. 3 is a system diagram of a data center according to one embodiment.

FIG. 3 is a system diagram of a data center according to one embodiment. FIG. 3 includes servers 306-1, 306-2, . . . , 306-N (e.g., referred to generally as servers 306). FIG. 3 also includes a switch 307, a network device 309, a management unit 314, and an Internet 315.

The switch 307 can distribute network traffic to the servers 306. As used herein, the switch 307 represents any type of device that can be configured to distribute network traffic to the servers 306. For example, the switch 307 can represent a switch and/or a router. The switch 307 can be an out-of-band switch.

The network device 309 can intercept network traffic directed to the switch 307. The network device 309 can include hardware and/or computer readable instructions configured to intercept the network traffic.

The management unit 314 can include hardware and/or computer readable instructions to determine whether any of the servers 306 are zombie servers. In some examples, the management unit 314, the network device 309, and/or the switch 307 can be configured as one or more computing devices. For example, the management unit 314, the network device 309, and/or the switch 307 can be integrated into a single computing device or multiple computing devices.

For example, a system for detecting a zombie server can include a server 306-1 comprising a processing resources and a computing device (e.g., the switch 307). The computing device can be configured to receive network traffic, calculate a percentage of the network traffic as being utility software layer 7 protocols every first time interval, mark the server as a zombie server based on the percentage every second time interval, and distribute the network traffic to the server 306-1.

The utility software layer 7 protocols can be received at least on a predetermined port. The utility software layer 7 protocols can be identified based on a header of a plurality of packets comprising the network traffic. The utility software layer 7 protocols can also be identified based on a payload of a plurality of packets comprising the network traffic.

The computing device can also be configured to decrypt at least one of a header and a payload of a packet. The computing device can also be configured to identify the utility software layer 7 protocols based on at least one of the header and the payload of the packet.

In a different embodiment, the server 306-1 can be configured to receive, at a server 306-1, network traffic and calculate a percentage of the network traffic as being productivity software layer 7 protocols every first time interval. The server 306-1 can also be configured to mark the server 306-1 as a zombie server based on the percentage every second time interval, and process the network traffic at the server to perform a number of actions by the productivity software.

The server 306-1 can also be configured to calculate the percentage of the network traffic, and the marking of the server as the zombie server occurs at a management unit. Calculating the percentage can further comprise determining that a portion of the plurality of packets comprising the network traffic is associated with productivity software layer 7 protocols. Calculating the percentage can further comprise dividing the portion of the plurality of packets by the plurality of packets.

Determining that the portion of the plurality of packets is associated with productivity software layer 7 protocols can further include identifying the layer 7 protocols from the network traffic and bucketizing the layer 7 protocols. Bucketizing the layer 7 protocols can further include identifying the portion of the plurality of packets that comprise the network traffic as corresponding to productivity software layer 7 protocols.

In some embodiments, the network device 309 can include a computer-readable medium having instructions stored therein, the instructions comprising receiving network traffic sent to a first computing device (e.g., the switch 307), wherein the first computing device is configured to distribute the network traffic to a plurality of servers 306 and calculating a percentage of a portion of the network traffic as being utility software layer 7 protocols every first time interval, for each of the plurality of servers 306, wherein the portion of the network traffic is network traffic to a respective server 306-1. The instructions can also comprise marking each of the plurality of servers 306 as zombie servers based on a respective percentage every second time interval and forwarding the network traffic to the first computing device (e.g., the switch 307).

Calculating the percentage of the portion of the network traffic can be performed at a third computing device. The third computing device can be the management unit 314. Calculating the percentage of the portion of the network traffic can also include forwarding information regarding layer 7 protocols from the portion of the network traffic and utility software layer 7 protocols from the portion of the network traffic to the third computing device. Calculating the percentage of the portion of the network traffic includes dividing the utility software layer 7 protocols by the layer 7 protocols.

Figure 4:
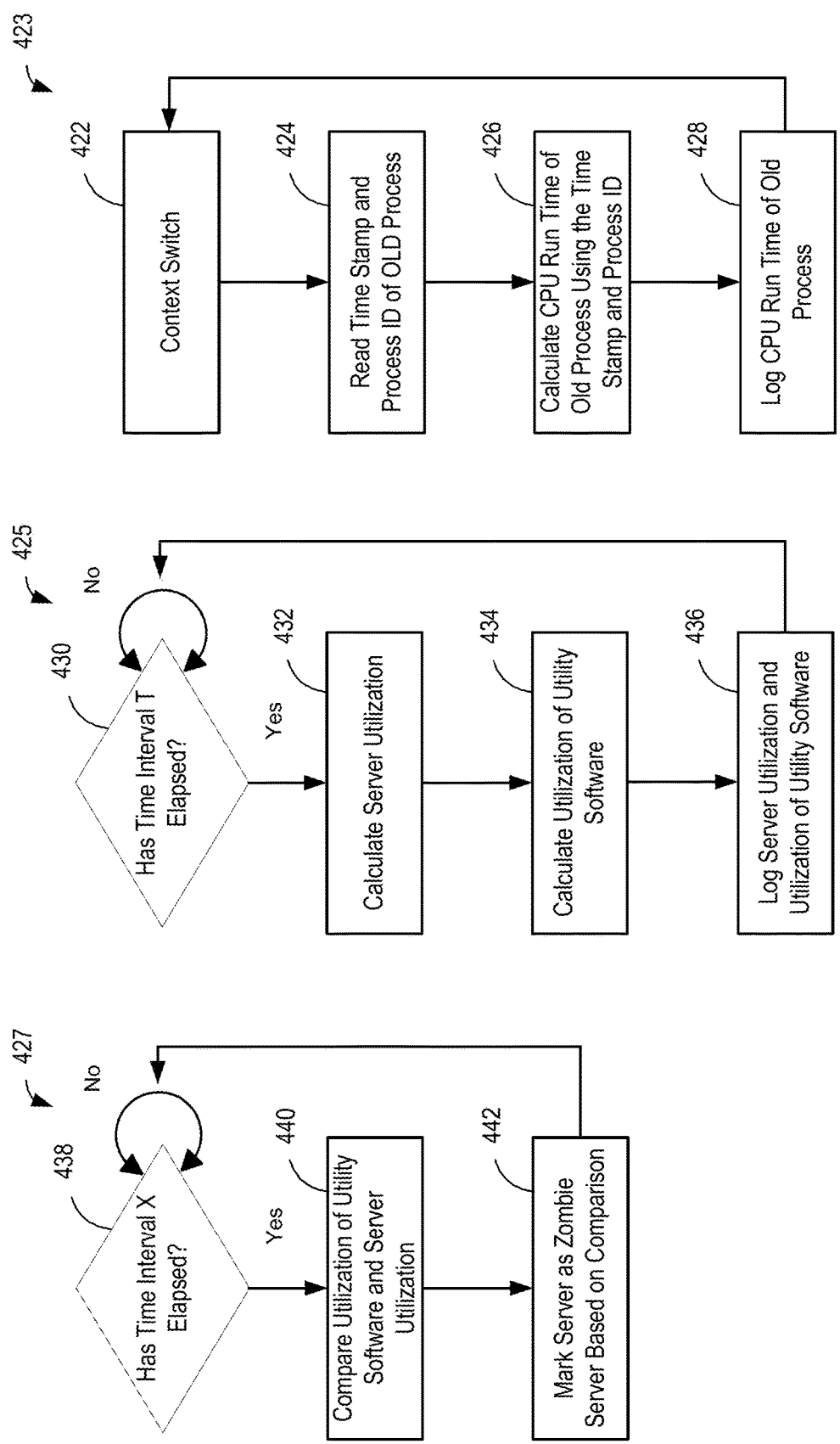
FIG. 4 is a flowchart of an approach to identifying a zombie server according to one embodiment.

FIG. 4 is a flowchart of an approach to identifying a zombie server according to one embodiment. FIGS. 4, 5, 6, and 7 include multiple flowcharts that can be processed separately and/or sequentially. For example, flowcharts 423, 425, and 427 are shown in FIG. 4 In some examples, flowcharts 423, 425, and 427 can be processed independently from each other. For example, the flowcharts 423, 425, and 427 can be processed and/or performed in separate threads, processors, and/or computing devices.

The flowcharts 423, 425, and 427 can also be performed sequentially. For example, the flowchart 427 can be performed in a same processor such that only one of the flowcharts 423, 425, and 427 is performed at a given time.

At the flowchart 423, it can be determined whether a context switch 422 has been performed. The context switch 422 can relate to the switching out of a first process for a second process in a processing resource.

In a number of examples, each of the processes including the first process and the second process can be labeled as processes originating from utility software or productivity software. That is, each of the processes can be labeled as utility software and/or productivity software. The processes can be labeled by an IT specialist and/or a customer in anticipation of identifying a zombie server. In some examples, the processes can be labeled at run time. For example, processes that are associated with software that is directly accessed by a customer for productivity activities can be labeled productivity software while processes that are associated with management services can be labeled utility software.

At each context switch 422, a process identification (ID) of an old process and/or a time stamp can be read 424. Each of the processes that were labeled can be identified using a process ID. As such, an old process can be identified using a first process ID and a new process can be identified using a second process ID. The old process can denote a process that was switched out of context at the context switch 422. The new process can denote a process that was switched into context at the context switch 422. The old process can also be referred to as a first process, and the new process can be referred to as a second process. The time stamp can be associated with the old process and/or the new process such that each context switch 422 can be associated with a unique time stamp.

Associating a time stamp with the old process and/or the new process can lead to use of the time stamp as a stop time stamp for the old process and a start time stamp for the new process. For example, the start time for the new process can be given as t(n+1) which can also be the stop time for the old process. The start time for the old process can be given as tn. The duration for which the old process ran is given as t(n+1)−tn.

The old time stamp, the new time stamp, the old process ID, and/or the new process ID can be used to calculate 426 a CPU run time of the old process and/or the new process. The CPU run time of the old process refers to a duration of time that the old process was executed on a processing resource for the duration of time spanning context switches 422 in which the old process was executed on a processing resource.

At each context switch 422, the CPU run time of the old process can be logged 428 in a memory resource of a management unit (e.g., the management unit 214 in FIG. 2) and/or the server on which the old process was executed. The CPU run time of the old process can be logged 428 to provide a tally of the CPU run times that are associated with the process ID of the old process at a later time.

For example, at a first context switch, a first time stamp (e.g., tn) can be read and associated with a first process with a first process ID, the first process being switched into context. At the first context switch, a first CPU run time can be calculated for a process that was switched out of context at the first context switch.

At a second context switch, a second time stamp (e.g., t(n+1)) can be read and associated with a second process with a second process ID, the first process being switched out of context and the second process being switched into context. At the second context switch, a second CPU run time (e.g., PCPUx) of the context switch can be calculated by subtracting the first time stamp from the second time stamp (t(n+1)−tn). The result of the second CPU run time of the context switch can be added to a tally of CPU run times of CPU run times associated with a respective process ID. For example, PCPUx=PCPUx+(t(n+1)−tn). The second CPU run time can be stored (e.g., logged 428) in the server hosting the second CPU run time.

After logging 428 the CPU run time, the old process, and/or the old process ID, the flowchart 423 can be processed again at a next context switch.

The flowchart 425 can include determining 430 whether a time interval T has elapsed. Determining 430 whether the time interval T has elapsed can include repetitively determining 430 whether the time interval T has elapsed until the time interval T has actually elapsed.

The time intervals T and X can be selected by an IT specialist. The time intervals T and X can be predetermined. The time intervals T and X can include separate beginning times and end times. The time span between the beginning time and the end time can define the time interval T. The time interval T can be a time over which the CPU run times are used to calculate 432 a server utilization and to calculate 434 a utilization of utility software. The time interval X can be an evaluation time in which a server is evaluated to determine whether the server is a zombie server. A determination of whether a server is a zombie server can be performed every time interval X 438.

A time interval T can be a millisecond, a second, or any interval thereof. A time interval X can be a second, an hour, a day, a plurality of days, or any interval thereof, among other possible time intervals. The time interval X can be greater than the time interval T.

If the time interval T has elapsed, then a server utilization can be calculated 432. The server utilization can be calculated 432 using the logged 428 CPU run times. For example, a utilization for each process ID associated with the CPU run times can be calculated to calculate 432 the server utilization. The utilization (e.g., Upu) for each of the process IDs can be calculated by dividing the corresponding CPU run time by the time interval T (e.g., Te) such that Upu=PCPUx/Te.

Calculating 432 the server utilization (e.g., Su) over the time interval T (e.g., Te) can include summing utilization for the process IDs. That is, the Upus associated with each of the process ID is summed to calculate 432 the server utilization (Su).

Calculating 434 the utilization (e.g., Sutu) of utility software can include summing all the utilization (e.g., Upu) for processes labeled utility software. The flowchart 425 can also include logging 436 the server utilization and the utilization of utility software. Logging 436 the server utilization can include adding the server utilization calculated over the time interval T to previously calculated server utilizations over different iterations of the time interval T. Logging 436 the utilization of the utility software can include adding the utilization of the utility software over the time interval T to the previously calculated server utilizations over different iterations of the time interval T.

The flowchart 427 can include determining 438 whether the time interval X has elapsed. The determination 438 can be made until the time interval X has elapsed. If the time interval X has elapsed, then the utilization of utility software and the server utilization can be compared 440.

The server for which the server utilization and the utilization for the utility software are calculated can be marked based on the comparison 440. Comparing the utilization of the utility software and the server utilization can include dividing the utilization of the utility software by the server utilization. If the result of the division is smaller than a predetermined threshold, then the server can be marked as a zombie server 442.

In other embodiments, comparing the server utilization and the utilization of the utility software can include determined whether a difference between the server utilization and the utilization of the utility software is greater than a predetermined threshold. As such, the server that hosts the processing resource can be identified as a zombie server based on a determination that the difference is smaller than a threshold.

FIG. 5 is a flowchart of an approach to identifying a zombie server according to one embodiment. FIG. 5 includes flowcharts 525, 527, and 529. If the flowcharts are implemented sequentially, then the flowchart 529 can be implemented before the flowchart 527 which can be implemented before the flowchart 525. The flowcharts 525 and 527 are analogous to the flowcharts 425 and 427 in FIG. 4.

The flowchart 529 can include determining 522 whether a time interval Y has elapsed. The determination 522 can be performed until the time interval Y has elapsed.

In a number of examples, the time interval X can be greater than the time interval T which is greater than the time interval Y. For example, the time interval X can be measured in days. The time interval T can be measured in seconds. The time interval Y can be measured in milliseconds, although other durations of times can be selected for the time intervals X, T, and Y. That is, in some examples, the time interval Y can be provided in multiples of milliseconds and the time interval T can be provided in intervals of seconds.

If the time interval Y has elapsed, then a process ID of an active process can be read 524. Reading 524 the process ID of an active process can include sampling a process ID of a process being executed on a processing resource of a server repetitively over the time interval Y. That is, an active process can be a process that is being executed on the processing resource of the server.

A CPU run time of the active process can be calculated 526. Calculating 526 the CPU run time can include determining the duration of time between the last time interval Y and the current time interval Y. The duration of time can be given as m. M may be equal to the time interval Y if the determination that the time interval Y elapsed occurs at the exact interval Y. M may also be equal to the duration of times between consecutive determinations that the time interval Y has elapsed. The CPU run time (e.g., PCPUx) can be calculated as PCPUx=PCPUx+m. The flowcharts 525 and 527 can be processed as described by the flowcharts 425 and 427 in FIG. 4.

In the examples provided in FIGS. 1-7, a processing resource can include one or more processing resources. For example, the processing resource of a server can include one or more CPUs. As such, reading a process ID of a process being executed on a processing resource can include reading a plurality of process IDs being executed on the processing resources. As such, at every context switch as described in FIG. 4 or at each time interval Y, a plurality of process IDs can be read. That is, each CPU can host a process and, as such, a process ID can be read for each process being executed on each of the CPUs in a server.

Figure 6:
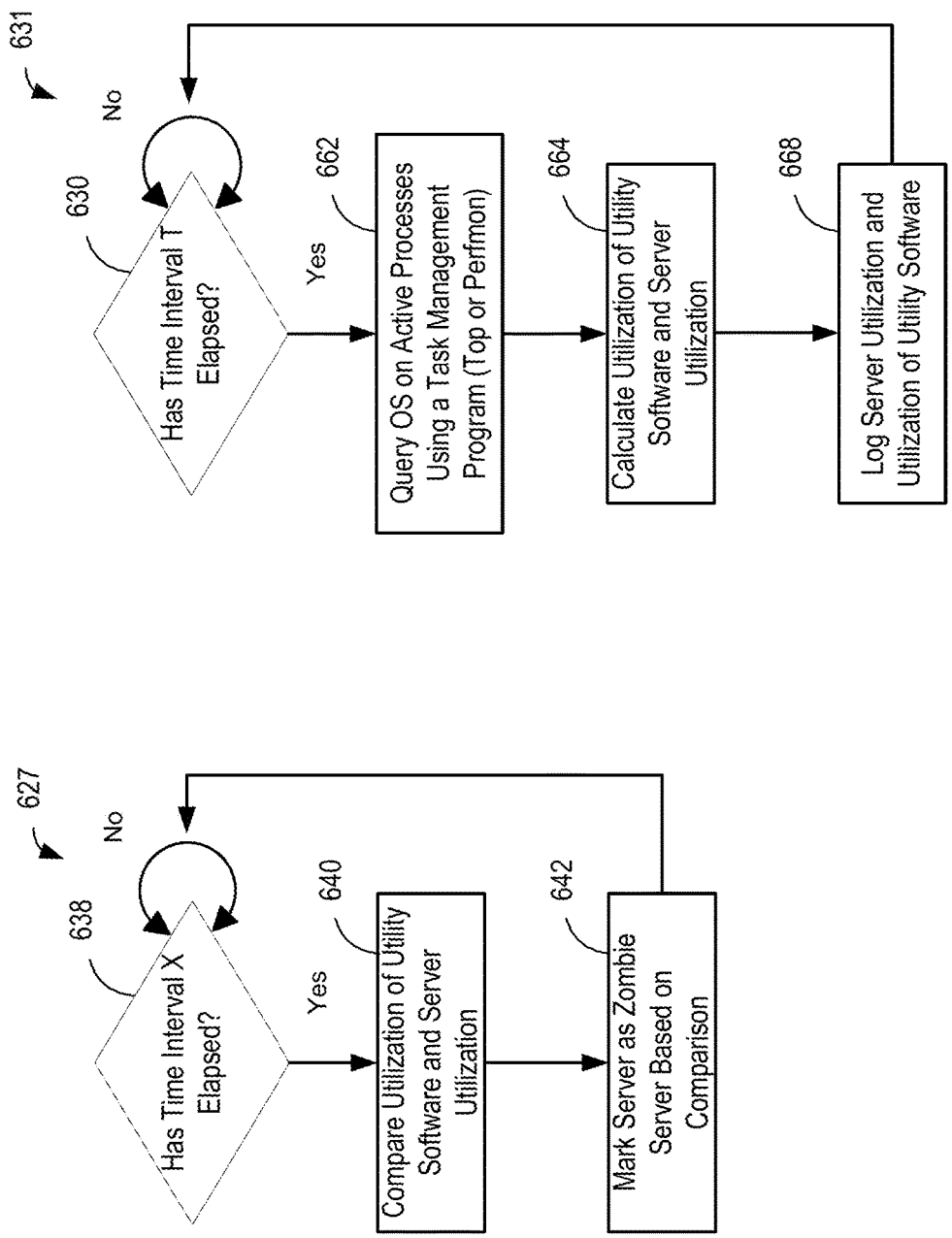
FIG. 6 is a flowchart of an approach to identifying a zombie server according to one embodiment.

FIG. 6 is a flowchart of an approach to identifying a zombie server according to one embodiment. FIG. 6 includes flowcharts 627 and 631.

In the example provided in FIG. 6, existing tools are used to determine whether a server is a zombie server. The existing tools can include software and/or hardware to monitor processes at the application level. For example, existing tools may include task management programs. Task management programs may include Top and/or Perfmon.

The examples provided in FIG. 6 and FIG. 5 may differ in that the example provided in FIG. 5 may differentiate between productivity software that is performing utility tasks and productivity software that is performing productivity tasks, and the example provided in FIG. 6 may not. For example, even when an application (e.g., productivity software) is loaded, it may run its own processes for maintenance or security. For example, the application may run processes to check for updates, check if there are instant messages, and/or report that the application is active (e.g., alive). Such processes, although initiated by productivity software, may not perform productivity tasks but instead may perform utility tasks and, as such, may be considered as utility software. The example provided in FIG. 5 may classify productivity software that performs utility tasks as utility software.

At the flowchart 631 a determination 630 can be made as to whether the time interval T has elapsed. If the time interval T has elapsed, then the operating system (OS) can be queried 662 on active processes. The OS can be queried 662 using a task management program. In some examples, the result of the query 662 can be utilization of an active process or a CPU run time of the active process. If the result of the query 662 is a CPU run time, then a utilization of the active process can be calculated from the CPU run time as described above.

A server utilization can be calculated 664 from the utilization of the active process. A utilization of the utility software can be calculated 664 from the utilization of active processes that are marked as utility software. The server utilization and the utilization of utility software can be logged 668.

The flowchart 627 is analogous to the flowcharts 427 and 527 in FIGS. 4 and 5, respectively. As such, the utilization of the utility software and the server utilization can be compared 640 and a server can be marked 642 as previously described in FIGS. 4 and 5.

Figure 7:
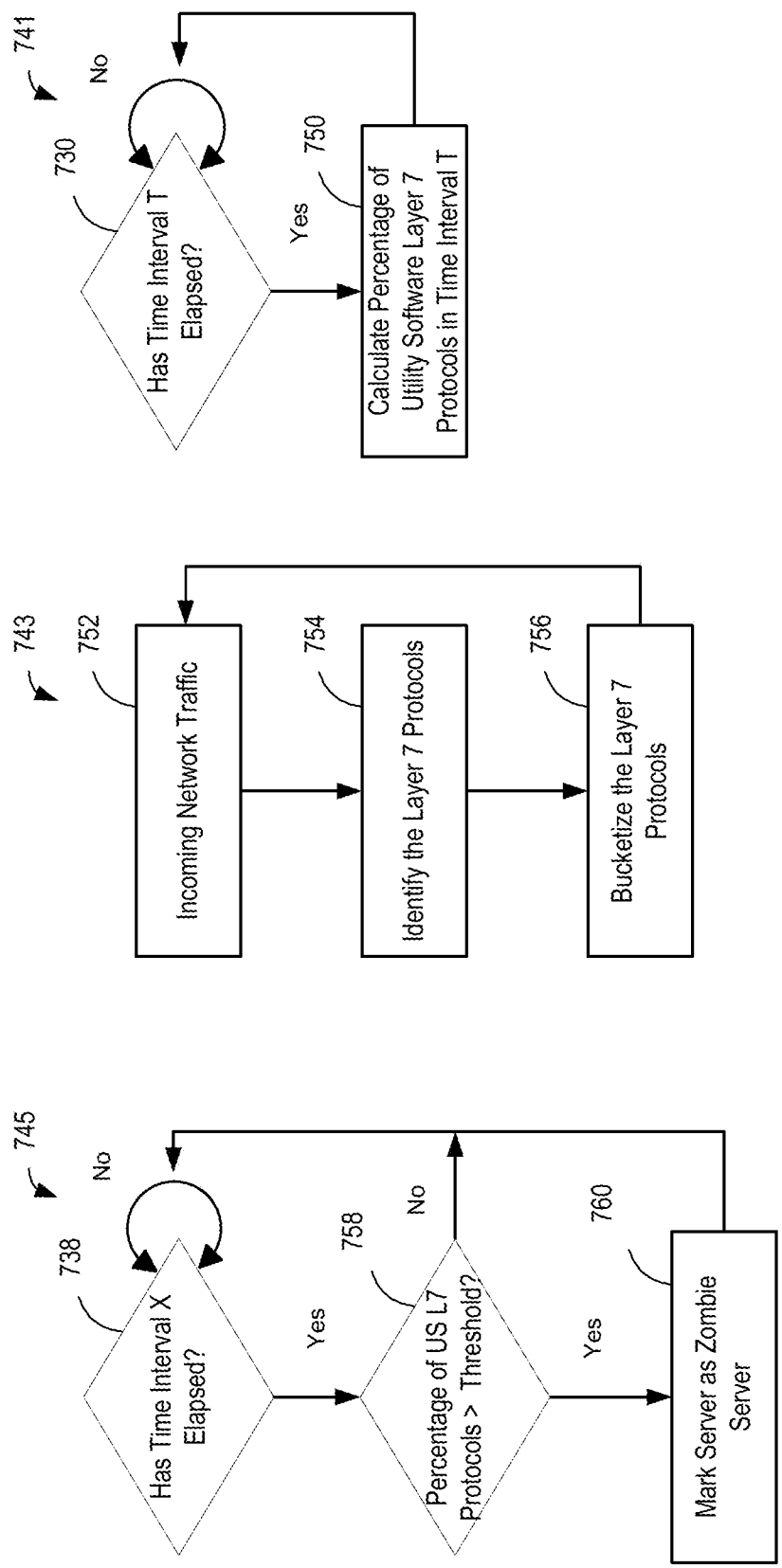
FIG. 7 is a flowchart of an approach to identifying a zombie server according to one embodiment.

FIG. 7 is a flowchart of an approach to identifying a zombie server according to one embodiment. FIG. 7 includes flowcharts 741, 743, and 745. The time interval X can be greater than the time interval T. The time interval X can be x days while the time interval T can be t seconds or t milliseconds.

In some embodiments, network traffic 752 associated with a server can be used to identify zombie servers. For example, the network traffic 752 can include the network traffic 752 to/from applications executing on a server. The network traffic 752 can be identified to determine whether the network traffic 752 is associated with utility software and/or productivity software. Identifying the type of the network traffic 752 coming to/from the server can provide the ability to determine whether productivity software is being executed on the server, which can in turn be used to identify zombie servers.

The flowchart 743 can include receiving incoming network traffic 752 at a computing device. The computing device can be a switch that can be out-of-band, a router, and/or a sniffer, among other computing devices that can be configured to receive network traffic. In some examples, the computing device can be configured to distribute the network traffic 752 to a plurality of servers.

The computing device can be a sniffer. As used herein, a sniffer can be an instrument, tool, hardware, and/or software that collects statistics on network packets received and sent. For example, a sniffer can intercept network traffic before the network traffic is distributed to the plurality of servers.

If the computing device receives incoming network traffic 752, then the OSI layer 7 protocols (e.g., application layer protocols) can be identified 754 from the network traffic 752. An application layer protocol is often associated with a particular TCP/IP port. In an embodiment, an administrator can identify network layer 7 protocols/ports that can be termed utility software. For example, the computing device can store a pre-canned list of layer 7 protocols that are termed utility software that can be modified. The pre-canned list of layer 7 protocols can include packets received via a port numbered 5723 for a system center operations manager (SCOM), for example.

The layer 7 protocols can be bucketized 756. Bucketizing 756 the layer 7 protocols can include separating the layer 7 protocols into buckets, groups, and/or categories. For example, the layer 7 protocols can be grouped by rate of arrival or frequency of occurrence of each type of protocol. In some examples, the network traffic can be bucketized 756 by bucketizing the packets comprising the network traffic.

The flowchart 741 can include determining 730 whether a time interval T has elapsed. If the time interval T has elapsed, then the bucketized layer 7 protocols can be examined to calculate 750 a percentage of the utility software layer 7 protocols in time interval T. One of the buckets in the bucketized layer 7 protocols can include layer 7 protocols associated with utility software. The bucketized layer 7 protocols can also include a grouping of productivity software.

The flowchart 745 can include determining 738 whether the time interval X has elapsed. If the time interval X has elapsed, then it can be determined 758 whether the percentage of the utility software layer 7 protocols is greater than a predetermined threshold. In FIG. 7, the utility software layer 7 is referenced as US L7. If the percentage is greater than the predetermined threshold, then the server can be marked 760 as a zombie server. If the percentage is not greater than the predetermined threshold, then it can be determined 738 whether the time interval X has elapsed.

As used in FIG. 7, a predetermined threshold can include any percentage that is selected before the determination is made. For example, an administrator can set the predetermined percentage. In some examples, the predetermined percentage can be 90%, 95%, or 99%, among other percentages.

Bucketizing the layer 7 protocols can include bucketizing the packets associated with the layer 7 protocols. Calculating the percentage 750 can include determining a percentage of the received packets that are associated with utility software.

In some embodiments, the computing device may receive network traffic for a plurality of servers each comprising processing resources. The computing device can be a sniffer. The computing device may be configured to distribute network traffic to the plurality of servers. For example, the computing device can be a switch or a router. The computing device may be referred to as a first computing device.

The first computing device can be configured to identify application traffic, from the network traffic, to the plurality of servers by identifying the layer 7 protocols. The identified application traffic can be associated with each of the plurality of servers. The application traffic can be network traffic to/from productivity software being executed in the plurality of servers.

In some embodiments, a second computing device can be configured to access the application traffic from the first computing device. The second computing device can be a management unit (e.g., the management unit 214 in FIG. 2). The second computing device can identify as zombie servers a portion of the plurality of servers that did not receive application traffic based on the identified application traffic that is associated with the plurality of servers. That is, if a server does not receive application traffic associated with productivity software being executed on the server, then the server can be marked as a zombie server.

The second computing device can further perform a management action on the zombie servers based on the identification of the portion of the plurality of servers as zombie servers.

Identifying the application traffic can further comprise identifying network traffic received on a predetermined port. For example, the network traffic received on a predetermined port can be classified as application traffic.

The application traffic may further be identified based on a header of a packet received at the first computing device. That is, each packet in the network traffic may be reviewed by reviewing the header information. The header information may have data that identifies the packet as application traffic.

The application traffic may also be identified based on a payload of a packet. The payload of the packet may be the body of the packet. The body of the packet may include information, instructions, and/or data that may be characteristic of information, instructions, and/or data received by productivity software being executed on a server. As such, the payload of a packet may be compared to predefined payloads that define application traffic.

In some embodiments, the payload may be encrypted or portions of the payload may be encrypted. As such, at least one of a header and/or a payload of a packet can be decrypted to identify application traffic. For example, the application traffic can be identified based on at least one of the header and the payload of the packet being identified as corresponding to application traffic.

Figure 8:
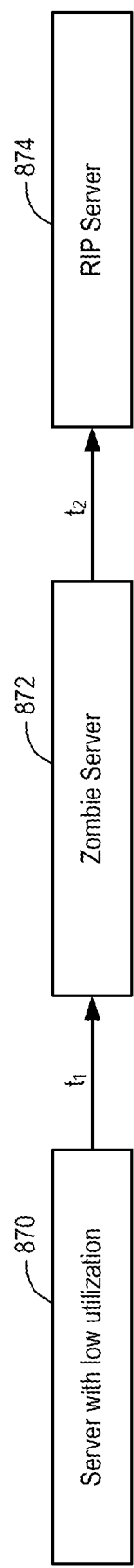
FIG. 8 is a flowchart for identifying a zombie server and taking an action based on the identification according to one embodiment.

FIG. 8 is a flowchart for identifying a zombie server and taking an action based on the identification according to one embodiment. FIG. 8 includes a server with low utilization 870, a zombie server 872, and a rest in peace (RIP) server 874.

The low utilization server 870 can represent a server that either has a low utilization of productivity software, utility software, and/or total server utilization. In some embodiments, the different approaches described in FIGS. 4-7 can be performed on low utilization servers (e.g., low utilization server 870) to determine whether the low utilization servers are zombie servers.

For example, any one or more of the embodiments described in FIGS. 4-7 can be applied to the low utilization server 870 to determine whether the low utilization server 870 is the zombie server 872. The embodiments described in FIGS. 4-7 can be applied at time t1. That is, the time t1 is the time interval X as described above.

The management unit and/or system administrator can take a number of actions based upon the identification of the zombie server 872. For example, the management unit can quarantine the zombie server 872 for a duration of time to better evaluate the zombie server 872. The system administrator can provide a notice to the owner of the hardware or application that the server is not used and may be decommissioned or reassigned.

The management unit can retest the zombie server 872 at different time periods to determine whether the zombie server 872 is also marked as a zombie server at different times. The management unit can apply different embodiments from the embodiments described in FIGS. 4-7 to determine whether the different embodiments mark the zombie server 872 as a zombie server. For example, the embodiment described in FIG. 4 can be applied to the low utilization server 870 to determine whether the low utilization server 870 is the zombie server 872. If the embodiment described in FIG. 4 marks the low utilization server 870 as the zombie server 872, then a management unit can apply the embodiment described in FIG. 7 to determine whether the embodiment described in FIG. 7 also marks the now classified zombie server 872 as a zombie server. This process can be repeated a number of times using the embodiments described in FIGS. 4-7.

In some embodiments, the management unit can disable access to the zombie server 872 to incentivize a user to request access to the zombie server 872. That is, if a user is utilizing the zombie server 872, then the low utilization server 870 may have incorrectly been marked as the zombie server 872. If the user requests access to the zombie server 872, then the zombie server 872 can be classified as a non-zombie server, the low utilization server 870, and/or a different classification altogether.

If access to the zombie server 872 is not requested by time t2 after access to the zombie server 872 has been disabled, then a terminating action may be taken. A terminating action can include deactivating the zombie server 872 and/or repurposing the zombie server 872, among other possible actions that can be taken to conserve the resources expended on the zombie server 872.

ADDITIONAL EXAMPLES

The following examples may include subject matter such as a method, means for performing acts of the method, at least one machine-readable medium including instructions that, when performed by a machine cause the machine to perform acts of the method, or of an apparatus or system, according to embodiments and examples described herein.

Example 1 is a method for detecting a zombie server. The method includes labeling a variety of processes as utility software, calculating a utilization of utility software on the variety of processes executed in one or more processing resources during an interval of time, calculating a server utilization of the one or more processing resources during the interval of time, determining whether a difference between the utilization of utility software and the server utilization is greater than a threshold, and identifying a server that hosts the processing resource as a zombie server based on a determination that the difference is smaller than the threshold.

In Example 2, the subject matter of Example 1 or 2, or any of the Examples described herein, may further include the method where calculating the utilization of utility software also includes storing a first time stamp based on the occurrence of a first context switch.

In Example 3, the subject matter of Example 2 or any of the Examples described herein may further include the method where calculating the utilization of utility software also includes storing a second time stamp based on the occurrence of a second context switch.

In Example 4, the subject matter of Example 3 or any of the Examples described herein may further include the method where calculating the utilization of utility software may also include determining a process identification (ID) for a process from the variety of processes that was switched out of the processing resource at the second context switch. The method may also include calculating a central processing unit (CPU) run time that the process was hosted by one or more processing resources by subtracting the first time stamp from the second time stamp and adding the CPU run time to a total CPU run time associated with the process ID.

In Example 5, the subject matter of Example 4 or any of the Examples described herein may further include the method where calculating the utilization of utility software may also include dividing each of a variety of CPU run times including the total CPU run time for the variety of processes by the time interval, and summing a variety of results of the division of each of the variety of CPU run times by the time interval.

Example 6 is a system for detecting a zombie server. The system includes a first server with memory and at least one processing resource. The first server includes instructions to sample a variety of process identifications (IDs) of a variety of processes executed on a processing resource of a second server, where each of the variety of process IDs is sampled during a first time interval. The first server also includes instructions to calculate a variety of central processing unit (CPU) run times for the variety of process IDs based on the first time interval, where each of the variety of CPU run times correspond to one of the variety of process IDs. The first server further includes instructions to calculate a utilization of utility software on the variety of processes executed in the processing resource repetitively every second time interval, calculate a server utilization of the processing resource repetitively every second time interval, and determine whether the second server is a zombie server based on the utilization of utility software and the server utilization repetitively every third time interval.

In Example 7, the subject matter of Example 6 or any of the Examples described herein may further include the system where the third time interval is greater than the second time interval which is greater than the first time interval.

In Example 8, the subject matter of Example 6 or any of the Examples described herein may further include the system where the first time interval is provided in multiples of milliseconds.

In Example 9, the subject matter of Example 6 or any of the Examples described herein may further include the system where the second time interval is provided in multiples of seconds.

In Example 10, the subject matter of Example 6 or any of the Examples described herein may further include the system where the third time interval is a day.

In Example 11, the subject matter of Examples 6-10, or any of the Examples described herein, may further include the system which contains instructions to identify the server as the zombie server when utilization of the utility software is equal to the server utilization.

In Example 12, the subject matter of Examples 6-10, or any of the Examples described herein, may further include the system where the processing resource includes a variety of CPUs.

In Example 13, the subject matter of Examples 6-10, or any of the Examples described herein, may further include the system where the utilization of utility software and the server utilization are calculated by maintaining a running sum of the utilization of the utility software spanning the second time interval, and by maintaining a running sum of the server utilization spanning the second time interval.

Example 14 is a computer-readable medium with instructions stored therein. The instructions include querying a server on active processes running on a processing resource of a server using a task management program repetitively every first time interval. The instructions also include calculating a utilization of utility software based on the active processes that are associated with utility software, repetitively every first time interval, and calculating a server utilization based on the active processes every first time interval. The instructions further include comparing the utilization of the utility software and the server utilization every second time interval, and marking the server as a zombie server based on the comparison every second time interval.

In Example 15, the subject matter of Example 14 or any of the Examples described herein may further include the computer-readable medium where the task management program is Perfmon.

In Example 16, the subject matter of Example 14 or any of the Examples described herein may further include the computer-readable medium where the task management program is Top.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A non-transitory computer-readable medium having instructions stored therein, the instructions comprising:
   labeling a plurality of processes as utility software;
   calculating a utilization of the utility software on the plurality of processes executed in one or more processing resources during an interval of time;
   calculating a server utilization of the one or more processing resources during the interval of time;

determining whether a difference between the utilization of the utility software and the server utilization is greater than a threshold; and identifying a server that hosts the one or more processing resources as a zombie server based on a determination that the difference is smaller than the threshold.

2. The non-transitory computer-readable medium of claim 1, wherein calculating the utilization of the utility software further comprises storing a first time stamp based on an occurrence of a first context switch.

3. The non-transitory computer-readable medium of claim 2, wherein calculating the utilization of the utility software further comprises storing a second time stamp based on an occurrence of a second context switch.

4. The non-transitory computer-readable medium of claim 3, wherein calculating the utilization of the utility software further comprises:
determining a process identification (ID) for a process from the plurality of processes that was switched out of the one or more processing resources at the second context switch;
calculating a central processing unit (CPU) run time that the process was hosted by the one or more processing resources by subtracting the first time stamp from the second time stamp; and
adding the CPU run time to a total CPU run time associated with the process ID.

5. The non-transitory computer-readable medium of claim 4, wherein calculating the utilization of the utility software further comprises:
dividing each of a plurality of CPU run times including the total CPU run time for the plurality of processes by a time interval; and
summing a plurality of results of the division of each of the plurality of CPU run times by the time interval.

6. A system for detecting a zombie server, the system comprising:
a first server comprising memory and at least one processing resource, the first server comprising instructions to:
sample a plurality of process identifications (IDs) of a plurality of processes executed on a processing resource of a second server, wherein each of the plurality of process IDs is sampled during a first time interval;
calculate a plurality of central processing unit (CPU) run times for the plurality of process IDs based on the first time interval, each of the plurality of CPU run times corresponding to one of the plurality of process IDs;
calculate, using the CPU run times for the plurality of process IDs, a utilization of utility software on the plurality of processes executed in the processing resource repetitively every second time interval;
calculate, using the CPU run times for the plurality of process IDs, a server utilization of the processing resource repetitively every second time interval; and
determine whether the second server is a zombie server based on a comparison of utilization of the utilization of the utility software and the server utilization repetitively every third time interval.

7. The system of claim 6, wherein the third time interval is greater than the second time interval which is greater than the first time interval.

8. The system of claim 6, wherein the first time interval is provided in multiples of milliseconds.

9. The system of claim 6, wherein the second time interval is provided in multiples of seconds.

10. The system of claim 9, wherein the processing resource includes a plurality of CPUs.

11. The system of claim 6, wherein the third time interval is a day.

12. The system of claim 6, further comprising instructions to identify the second server as the zombie server when utilization of the utility software is equal to the server utilization.

13. The system of claim 6, wherein the utilization of the utility software and the server utilization are calculated by:
maintenance of a running sum of the utilization of the utility software spanning the second time interval; and
maintenance of a running sum of the server utilization spanning the second time interval.

14. A method, comprising:
querying a server on active processes running on a processing resource of the server using a task management program repetitively every first time interval;
calculating a utilization of utility software based on the active processes that are associated with the utility software, repetitively every first time interval;
calculating a server utilization based on the active processes every first time interval;
comparing the utilization of the utility software and the server utilization every second time interval; and
marking the server as a zombie server based on the comparison every second time interval.

15. The method of claim 14, wherein the task management program is Perfmon.

16. The method of claim 14, wherein the task management program is Top.

* * * * *